(12) United States Patent
Fay et al.

(10) Patent No.: US 7,173,435 B1
(45) Date of Patent: Feb. 6, 2007

(54) THICKNESS MEASURING APPARATUS AND METHOD USING A MICROWAVE CAVITY RESONATOR

(75) Inventors: Christopher W Fay, Seattle, WA (US); Anthony D Monk, Seattle, WA (US); Clifford C Olmsted, Seattle, WA (US); Edward G Sergoyan, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/340,685

(22) Filed: Jan. 27, 2006

(51) Int. Cl.
*G01R 27/04* (2006.01)
(52) U.S. Cl. .................................. 324/636; 324/635
(58) Field of Classification Search ................ 324/636, 324/635
See application file for complete search history.

(56) References Cited

U.S. PATENT DOCUMENTS

| 5,563,505 A | 10/1996 | Dorothy et al. |
| 5,648,038 A | 7/1997 | Fathi et al. |
| 6,184,694 B1 | 2/2001 | Anderson et al. |
| 6,297,648 B1 | 10/2001 | Lunden |
| 6,359,446 B1 | 3/2002 | Little, Jr. |
| 2005/0156606 A1* | 7/2005 | Sergoyan et al. ........... 324/635 |

OTHER PUBLICATIONS

Tina Hilding, et al., "WSU Students Come up With Potential Solutions to Boeing's Sticky Problem", Jun. 19, 2002, whole document.
Corbin Champion, et al. "Measuring Paint Thickness on Composite Materials", Apr. 30, 2002, pp. 1-8.
T.Y. Otoshi, et al., "Noise Temperature and Gain Loss Due to Paints and Primers: A case Study of DSN Antennas", Jun. 3, 2001, pp. 11-28.

* cited by examiner

*Primary Examiner*—Vincent Q. Nguyen
(74) *Attorney, Agent, or Firm*—Baker & Hostetler LLP

(57) ABSTRACT

A measurement device for measuring a thickness of a film layer over a substrate utilizes a microwave source and a resonant cavity having an open side. A microwave signal is introduced at a first end of the resonant cavity with the open side against a surface measurement sample having a film layer over a substrate, and an output signal detector senses the output power of the signal at a far end of the resonant cavity. A processor uses a difference in the resulting resonant frequency of the cavity from that using a substrate without the film layer to determine the thickness of the film layer.

27 Claims, 5 Drawing Sheets

THICKNESS MEASURING APPARATUS AND METHOD USING A MICROWAVE CAVITY RESONATOR

FIELD OF THE INVENTION

The present invention relates generally to the field of measurements. More particularly, the present invention relates to nondestructive measurement of the thickness of a dielectric film over a radiopaque substrate using electromagnetic cavity resonance principles.

BACKGROUND OF THE INVENTION

Nondestructive measurement of a film thickness is an important objective for many industries. For example, in the aircraft industry, paint for functional and decorative purposes is often applied to aircraft surfaces, which may have near critical weight. Also, prior to applying a surface paint, care must be taken to ensure that an adequate amount of primer is uniformly applied with an adequate thickness to act as a proper corrosion inhibitor. For example, in some aircraft applications, a paint film thickness of 0.4 to 1.0 thousandth of an inch (mil) over the surface of the substrate is desirable. Moreover, depending on the model of aircraft, over 500 pounds of primer and topcoat may be applied to an aircraft in accordance with customer specifications.

Since the weight and distribution of paint on aircraft surfaces may sometimes affect the performance of the aircraft it is desirable to apply and measure the paint in a controlled means in order to generally apply a minimum adequate thickness. This measurement is desirable to ensure that the primer is sufficiently thick for corrosion protection, but not so thick as to unnecessarily add to the weight of the airplane, which can negatively affect fuel efficiency. After the primer thickness is determined to be of sufficient thickness, a top coat of paint can be applied.

Aircraft components that are made of a metallic material can have their coatings measured by several conventional commercial tools. However, components are increasingly manufactured from carbon or glass fiber reinforced composite materials. These materials are difficult to measure using conventional techniques since they have relatively low direct-current conductivity and magnetic permeability.

Another conventional alternative is to wait for the paint to dry and indirectly measure the paint film thickness by weighing the component in question. This can result in an undesirable cycle delay of, for example, up to three hours. For example, when primer needs to be measured on a composite component, the component may first be weighed, then painted and finally reweighed. However, this process can be prohibitively difficult in the case of large components, for example, an airplane fuselage. Since an acceptably accurate and dependable direct measurement technology for composite materials is not available, when the primer film is suspected of being excessively thick or uneven, the component typically must be disassembled and repainted at significant cost and risk of damage.

Commercial ultrasonic measurement systems, such as Panametric 45L Deluxe®, are available which give some paint measurement thickness data for some types of composites. The Panametric 45L Deluxe® is useable for relatively thick coatings, but for thin coatings of paint this ultrasonic system is not sufficiently reliable and accurate to meet some specification requirements.

Additionally, the nondestructive measurement of film thickness is of concern to other industries, such as the automotive industry and the paper production industry. In the automotive industry, the analysis of primer film thickness is important, for example, to determine whether additional touchup work is required for some of the paint applications common to the industry. In the paper industry, verifying the uniformity of the paper thickness can be an important quality control issue. With the increasing use of composite materials, it has become apparent that current methods of measurement that perform adequately with metallic substrates or with thick films, but not with substrate materials that have relatively low direct-current conductivity and magnetic permeability or with thin films, are not sufficient.

Therefore, there is a need in various industries for systems and methods that are capable of nondestructive measurement of a thin film thickness over substrate materials that have relatively low direct-current conductivity and magnetic permeability.

SUMMARY OF THE INVENTION

The foregoing needs are met, to a great extent, by the present invention, wherein in one aspect an apparatus is provided that in some embodiments can be capable of nondestructive measurement of a thin film thickness over a substrate material that has relatively low direct-current conductivity and magnetic permeability.

In accordance with one aspect of the present invention, a measurement device for measuring a thickness of a film layer over a substrate can include a resonant cavity having an open side, wherein at least a segment of a face around the open side contacts at least a portion of a surface of the film layer and the substrate acts as a wall of the resonant cavity. The measurement device can also include a microwave source to generate a super high frequency electromagnetic wave signal coupled to a first end of the resonant cavity and a signal detector to sense an output power of the signal coupled to a second end of the resonant cavity. The measurement device can further include a processor to correlate the output power to the thickness.

In accordance with another aspect of the present invention, a measurement device for measuring a thickness of a film layer over a substrate can include means for propagating a super high frequency electromagnetic wave signal, the propagating means having an open side, wherein at least a segment of a face around the open side contacts at least a portion of a surface of the film layer and the substrate acts as a wall of the propagating means. The measurement device can also include means for generating a super high frequency electromagnetic wave signal coupled to a first end of the propagating means and means for sensing an output power of the signal coupled to a second end of the resonant cavity. The measurement device can further include processing means for correlating the output power to the thickness.

In accordance with yet another aspect of the present invention, a method of measuring a thickness of a film layer over a substrate can include adhering a measurement device to at least a portion of a surface of the substrate and pressing at least a segment of a face around an open side of a resonant cavity having a first end and a second end against the surface with a substantially uniform pressure. The method can also include sequentially generating a plurality of super high frequency electromagnetic wave signals across a frequency range of at least one gigahertz using a monolithic microwave integrated circuit voltage-controlled oscillator having a variable output frequency and individually propagating each of the signals through the resonant cavity from the first end to the second end, the resonant cavity having a resonant frequency. The method can further include sensing an output power of each of the signals at the second end and correlating a frequency having a maximum output power to the thickness.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention provides a portable and accurate measurement device for measurement of a thin film thickness over a substrate that has relatively low direct-current conductivity and magnetic permeability. The measurement device can include a resonant cavity with an open side. The resonant cavity can include a chamber that has a predetermined electromagnetic resonant frequency in the microwave range when the open side is placed against the surface of a conductive material, which can act as a wall of the resonant cavity.

The measurement device can also include a microwave source that can produce an electromagnetic wave signal in the super high frequency range, for example, between three and thirty gigahertz (GHz), which can be introduced into the resonant cavity at one end, or side. For example, the device can include a monolithic microwave integrated circuit (MMIC) voltage-controlled oscillator (VCO) with a variable output frequency, or a dielectric resonator oscillator (DRO) with a fixed output frequency, or a combination of these. The device can further include a frequency multiplier to increase the signal frequency by a predetermined factor. For example, a relatively low-frequency signal can be generated at a remote location from the resonant cavity and converted to a relatively high-frequency signal before being introduced into the resonant cavity.

In addition, the measurement device can include a signal detector to sense an output power of the signal at another end, or side, of the resonant cavity. For example, the measurement device can include a Schottky diode sensor that produces a steady, or direct current, voltage in response to the power, or magnitude, of the microwave signal. Furthermore, the device can include a processor, such as a personal computer, to correlate the output power to the film thickness. The correlation can be based on, for example, either the output power at a fixed frequency or a frequency that produces a maximum output power within a frequency range.

Furthermore, the measuring device can include a choke groove, such as a precision-machined groove around a face on the open side of the resonant cavity. For example, the choke groove can encircle the open side of the resonant chamber in order to improve the effective electromagnetic conductivity between the resonant cavity and a measurement sample, such as a thin film over a substrate. The measuring device can be held against the surface of the film by vacuum cups arranged to produce a uniform pressure the between the resonant cavity and the measurement sample.

Figure 1:
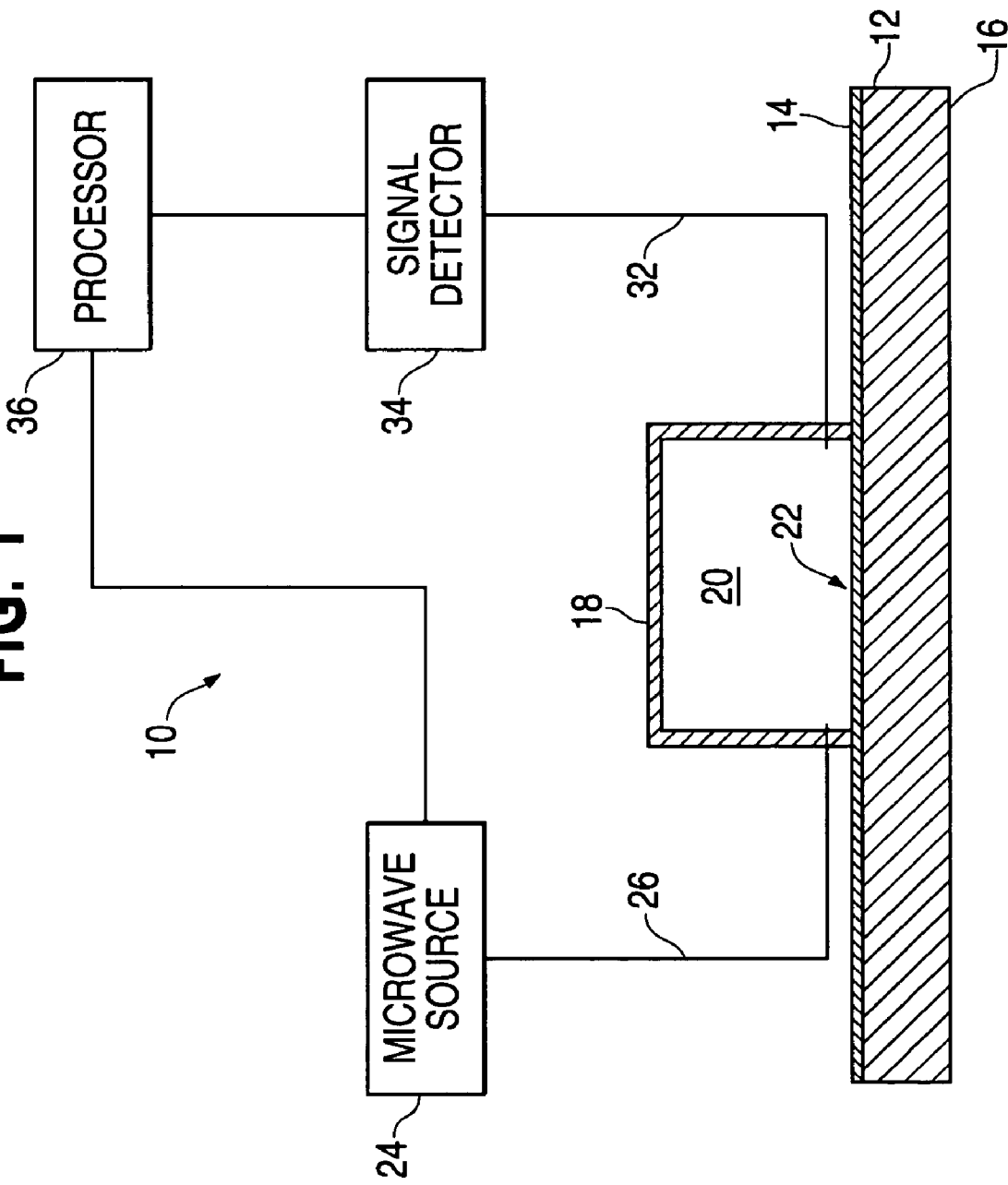
FIG. 1 is a block diagram of a measuring device according to an embodiment of the invention.

The invention will now be described with reference to the drawing figures, in which like reference numerals refer to like parts throughout. FIG. 1 is a block diagram of an exemplary measuring device 10 in proximity to a measurement sample 12. The measuring device 10 can be used to measure the thickness of a thin film layer 14, such as a coat of paint or paint primer, over a substrate 16. Generally, the substrate 16 must be substantially opaque to microwave radiation. The substrate 16 can be a relatively high-conductivity material, such as a metal, or a relatively low-conductivity material, such as a composite material, for example, a fiber reinforced polymer, including an epoxy matrix reinforced with carbon, graphite, boron or Kevlar, possibly intermixed with a metal or metal foil, such as TiGr, a fiber metal laminate, or the like.

The measuring device 10 can include a resonant cavity 18, including a chamber 20 with an open side 22, as depicted in FIG. 1. The remaining sides of the resonant cavity 18 can be enclosed by the chamber 20. The chamber 20 can have, for example, a rectangular shape or a cylindrical shape. In addition, the chamber 20 can be tuned to have a baseline electromagnetic resonant frequency in the microwave range when the open side 22 is placed against the surface of a conductive material, which can act as a wall of the resonant cavity 18, to enclose the chamber 20. In operation, the resonant cavity 18 can be placed in proximity to the measurement sample 12 with the open side 22 abutted against the measurement sample 12, as shown in FIG. 1.

Consequently, the surface of the measurement sample 12 can act as a wall of the resonant cavity 18. Thus, the thickness of the film layer 14 can determine the effective distance to the surface of the substrate 16, the effective size of the chamber 20 and the resulting resonant frequency of the resonant cavity 18. For example, in some cases, as the thickness of the film layer 14 increases, the size of the resonant cavity 18 increases and the resulting resonant frequency of the cavity 20 decreases. In effect, the resonant cavity 18 can act as a band-pass resonant cavity that can propagate a signal of a specific frequency band with minimal losses and can transmit signals of other frequency bands with greater losses.

The measuring device 10 can further include a microwave source 24, which can provide an electromagnetic wave signal in the microwave range, for example, in the super high frequency range between approximately three and thirty gigahertz (GHz). In one embodiment, the measuring device 10 can include a monolithic microwave integrated circuit (MMIC) voltage-controlled oscillator (VCO) microwave source 24 with a variable output frequency. This embodiment can also include an analog control voltage source coupled to the VCO to control, or tune, the output frequency of the VCO. In an alternative embodiment, the measuring device 10 can include a dielectric resonator oscillator (DRO) microwave source 24 with a fixed output frequency.

The signal can be introduced into the resonant cavity 18 at one end, or side, of the chamber 20 by way of an electrical link 26, such as a cable. At the far end, or side, of the chamber 20, the signal can be conducted through an electrical link 32 to a signal detector 34 that can sense an output power of the signal. For example, the signal detector 34 can include a Schottky diode sensor that converts the microwave signal into a steady state, or direct current, voltage signal. That is, Schottky diode sensor can produce a direct current voltage in response to the power, or magnitude, of the output microwave signal.

In addition, the measuring device 10 can include a processor 36, such as a personal computer (PC), a UNIX workstation, a server, a mainframe computer, a personal digital assistant (PDA), or some combination of these, to correlate the detected output power to the thickness of the film 14. Of course, in this case an analog-to-digital (A/D) conversion of the voltage signal would be required, as is well-known in the art. The processor can implement programming code, such as source code, object code or executable code, stored on a computer-readable medium that can be loaded into the processor memory and processed by the processor 36 in order to perform a correlation algorithm. The correlation algorithm can be based on, for example, either the output power at a fixed frequency or a frequency that produces a maximum output power within a frequency range.

For example, in an embodiment of the measuring device 10 that includes a VCO, the microwave source 24 can produce a series of discrete frequency signals, or "sweep," across a frequency range (e.g., a series of signals at intervals of one megahertz (MHz) from 10.5 GHz to 11 GHz). The signals can be sequentially introduced at one end of the resonant cavity 18 and the output signal power of each discrete frequency signal can be sensed at the far end of the resonant cavity 18 by the signal detector 34.

Figure 2:
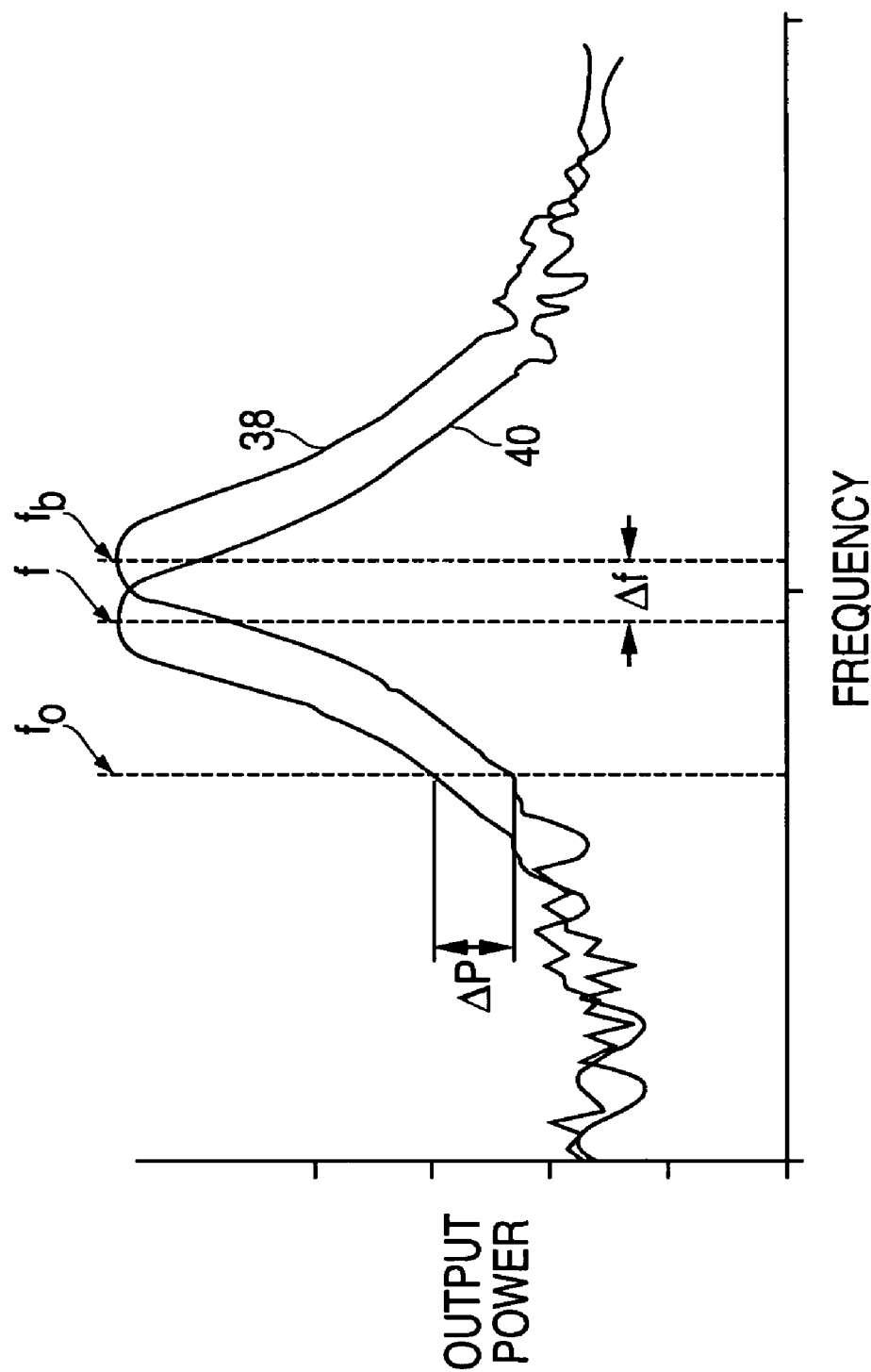
FIG. 2 is a graph illustrating a representative transmission response curve of the measuring device of FIG. 1.

In this embodiment, the output power of each discrete frequency signal will depend on the difference, or shift, between the baseline resonant frequency of the resonant cavity 18 and the resulting resonant frequency with the measurement sample 12 acting as one wall of the cavity 20. FIG. 2 illustrates two output power—frequency curves, a baseline curve 38 with maximum output power at the baseline resonant frequency, $f_b$, of the resonant cavity, and a resulting curve 40 with maximum power at the resulting resonant frequency, f, As shown in FIG. 2, the maximum power of the output signal will occur at the input frequency that is closest to the resulting resonant frequency, f, of the cavity 20, and the output power will decrease as the absolute difference increases between the input frequency and the resulting resonant frequency, f.

Therefore, for example, the processor 36 can receive the input signal frequency from microwave source 24 and the voltage signal from the signal detector 34 for each discrete frequency signal (which can be converted from analog to digital by an A/D converter outside the processor or within the processor). In an alternative embodiment, the processor 36 can provide a control signal to command the microwave source 24 to a specified frequency and receive the voltage signal from the signal detector 34. The processor can compare the voltage signals corresponding to the discrete frequency signals to determine the input frequency from the microwave source 24 that results in the maximum output power. The input frequency that results in the maximum output power can correspond to the resulting resonant frequency, f, of the resonant cavity 18, and the processor 36 can determine the difference, or shift, $\Delta f$, from the baseline resonant frequency, $f_b$, of the resonant cavity 18.

The processor 36 can then use empirical data to correlate the input frequency or the shift, $\Delta f$, of the resulting resonant frequency, f, from the baseline resonant frequency, $f_b$, to the thickness of the film layer 16. For example, experimental data using an embodiment that includes a VCO has indicated that the measuring device 10 can measure the thickness of film layers 14 from approximately one thousandth of an inch to at least ten thousandths of an inch. The data suggests that this embodiment may be capable of measuring the thickness of film layers 14 to approximately forty thousandths of an inch.

As another example, in an embodiment of the measuring device 10 that includes a DRO, the microwave source 24 can produce a signal at a specific frequency, $f_o$, (e.g., a signal with a frequency of 10.6 GHz). Once again, the signal can be introduced at one end of the resonant cavity 18 and the output signal power of the signal can be sensed at the far end of the resonant cavity 18 by the signal detector 34.

In this embodiment, the output power of the signal will also depend on the difference, or shift, between the baseline resonant frequency, $f_b$, of the resonant cavity 18 and the resulting resonant frequency, f, with the measurement sample 12 acting as one wall of the cavity 20. That is, the output power of the signal will decrease as the absolute difference increases between the signal frequency, $f_o$, and the resulting resonant frequency, f, of the resonant cavity 18. In particular, the signal frequency, $f_o$, of the microwave source 24 can be selected, or tuned, to have a difference from the baseline resonant frequency, $f_b$, of the resonant cavity 18 such that the transmission response curve of the output power will result in a measurable change or a maximized or optimized variance in output power, $\Delta P$, as a result of the resulting resonant frequency, f, shift from the baseline resonant frequency, $f_b$, with the measurement sample 12 acting as a wall of the resonant cavity 18.

Therefore, the processor 36 can receive the voltage signal from the signal detector 34 (which can be converted from analog to digital by an A/D converter outside the processor or within the processor) and compare the change in the output power, or attenuation, $\Delta P$, from that obtained with the baseline resonant frequency, $f_b$, of the resonant cavity 18. The processor 36 can then use empirical data to correlate the output power or attenuation to the thickness of the film layer 16. For example, experimental data using an embodiment that includes a DRO has indicated that the measuring device 10 can measure the thickness of film layers 14 from approximately one thousandth of an inch to at least two and a half thousandths of an inch.

Figure 3:
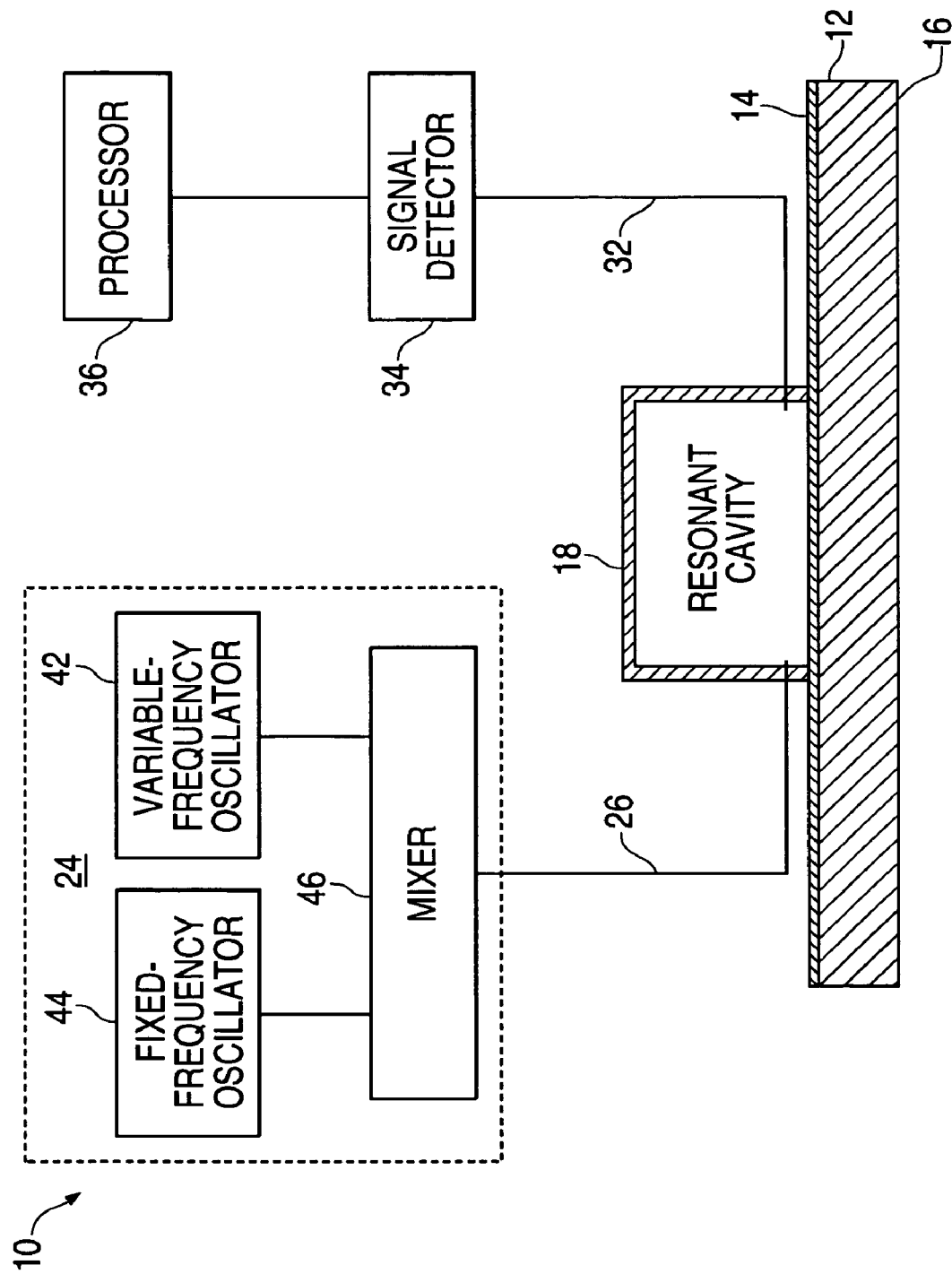
FIG. 3 is a block diagram of a measuring device according to an alternative embodiment of the invention.

In another embodiment of the measuring device 10, the microwave source 24 can include a combination of variable- and fixed-frequency oscillators, as illustrated in FIG. 3. In this embodiment, the output from a variable-frequency oscillator 42 can be heterodyned with the output from a fixed-frequency oscillator 44 by a mixer 46 to create a combined signal. For example, the variable-frequency signal can be added to or subtracted from the fixed-frequency signal. Thus, for example, the microwave source 24 can include a relatively high-fixed-frequency DRO and a relatively low-range variable frequency VCO to produce a super high frequency signal (e.g., 10.6 GHz or 24 GHz) that can be varied within a frequency range (e.g., 0.1 GHz, 0.5 GHz or 1 GHz).

Figure 4:
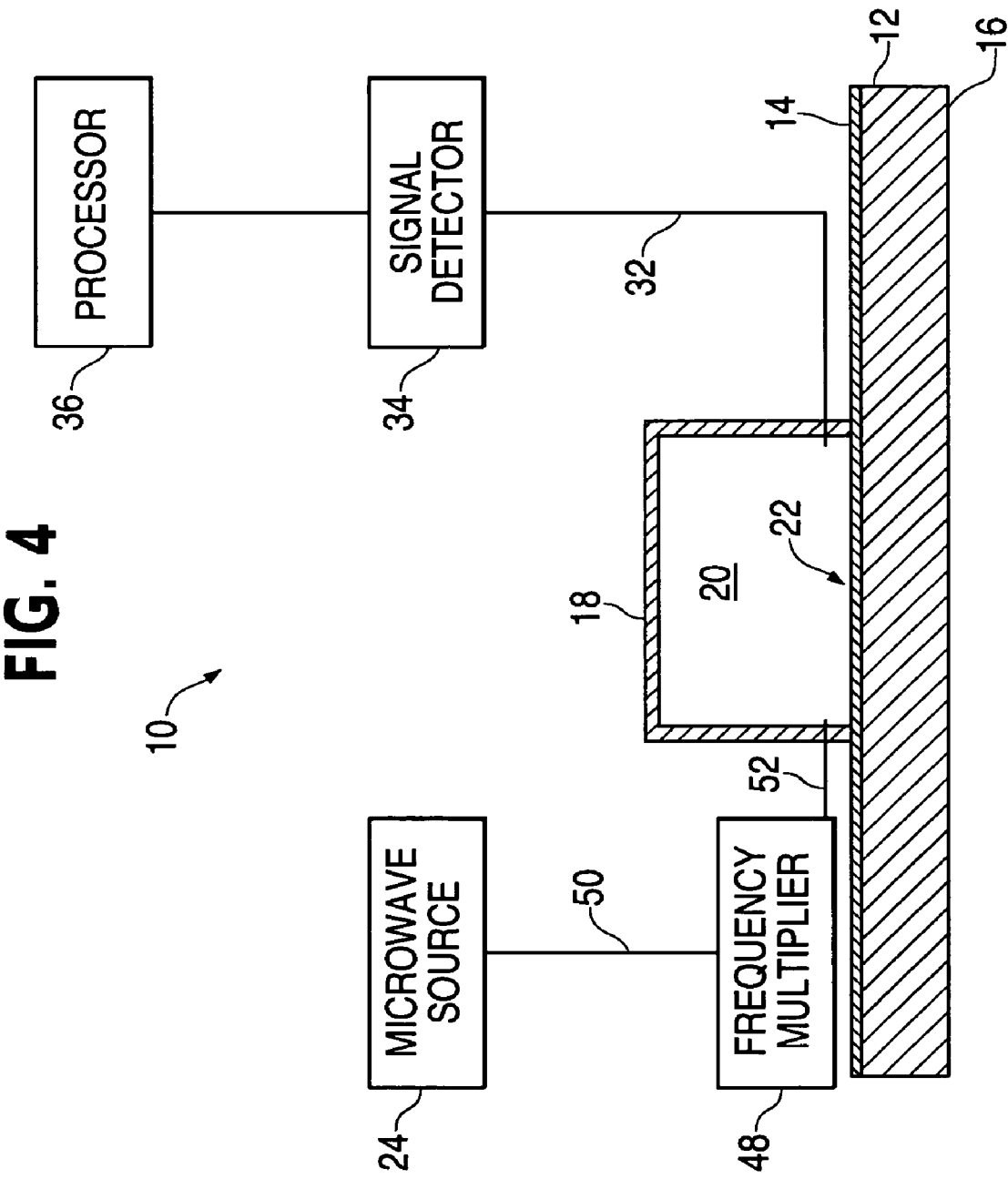
FIG. 4 is a block diagram of a measuring device according to another alternative embodiment of the invention.

In yet another embodiment, the measuring device 10 can also include a frequency multiplier 48, as illustrated in FIG. 4. The frequency multiplier 48 can be either a passive electronic device, which does not require an external power source, or an active electronic device that requires an external power source. The microwave source 24 can produce a relatively low-frequency subharmonic electromagnetic wave signal and the frequency multiplier 48 convert the signal to a relatively high-frequency signal. That is, the frequency multiplier 48 can increase the signal frequency by a predetermined factor.

For example, the frequency multiplier 48 can receive a signal having a frequency of 8 GHz, and multiply the frequency by a factor of three to produce a signal having a frequency of 24 GHz. As another example, the frequency multiplier 48 can receive a signal having a frequency of 6 GHz, and multiply the frequency by a factor of four to produce a signal having a frequency of 24 GHz.

In this embodiment the microwave source 24 can be located at a location that is remote from the resonant cavity 18 and the relatively low-frequency signal can be transmitted to the frequency multiplier through link 50, for example, a coaxial cable that is optimized for transmission of a relatively low-frequency signal, which can be relatively robust compared to a conductor that is designed to carry a higher-frequency signal. Since the power loss in a conductor is generally lower when a lower-frequency signal is conducted, the losses in link 50 can be reduced or minimized, because a relatively low-frequency signal is conducted by link 50. The frequency multiplier 48 can be collocated with, or located in close proximity to, the resonant cavity 18, as shown in FIG. 4, in order to reduce or minimize the length of the relatively high-frequency electrical link 52, which can couple the microwave source 10 to the resonant cavity 18. In this way, the losses in link 52 can also be reduced or minimized.

In addition, the size and weight of a resonant cavity sensor assembly can be reduced by locating the microwave source 24 remote from the resonant cavity 18. Furthermore, locating the microwave source 24 remotely from the resonant cavity 18 can thermally isolate the microwave source 24 from the resonant cavity 18 to avoid heat dissipation in the proximity of resonant cavity 18, which can adversely affect the accuracy of the measurement. This embodiment can facilitate the introduction of a higher frequency signal into the resonant cavity 18, as compared to an embodiment with the microwave source 24 located in close proximity to the resonant cavity 18, which can be desirable, since the use of a higher frequency signal can increase the sensitivity, resolution and accuracy of the measurement device 10 and permit the use of a smaller resonant cavity 18.

Furthermore, a preferred embodiment of the measuring device 10 can include a resonant cavity 18 that has more than one chamber 20 connected in series, such as that shown in FIG. 3, which illustrates a series of four resonant cavities 20 interconnected by intercavity coupling slots 54. Multiple resonant cavities 20, each of which can be tuned to the baseline resonant frequency, can serve to sharpen the resonance of the signal, resulting in a more narrow amplitude or power peak when plotted versus frequency. Thus, the accuracy or sensitivity of the measurement device 10 can be improved by the use of multiple resonant cavities 20.

Figure 5:
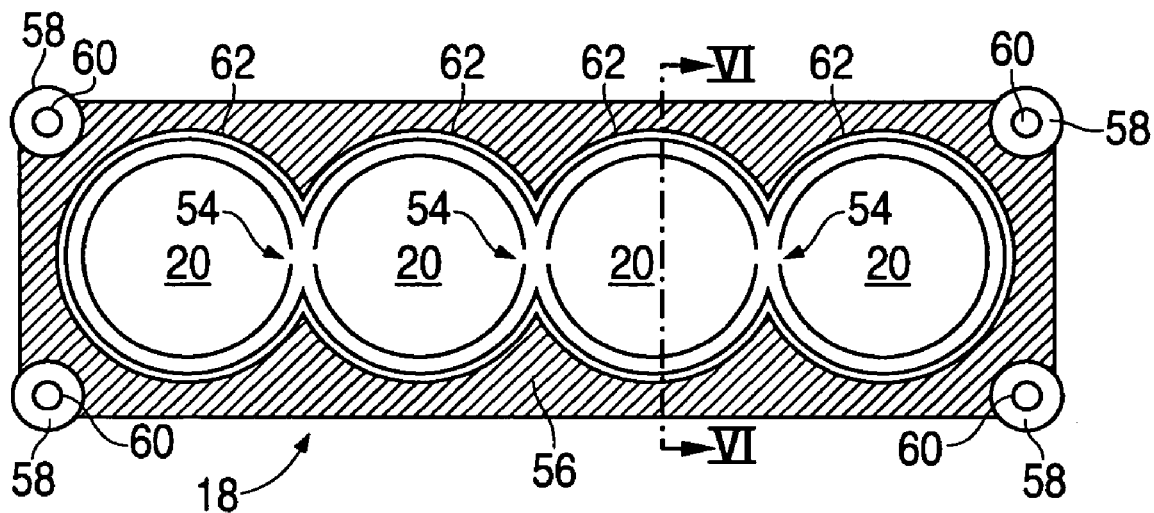
FIG. 5 is a plan view of an open side of a resonator cavity of the measuring device of FIG. 1.

Additionally, the resonant cavity 18 can have a generally planar face 56 around the chamber 20, as shown in FIG. 5. In operation, the face 56 can interface with the surface of the measurement sample 12. In some embodiments, the measuring device 10 can be held against the surface of the measurement sample 12 by vacuum cups 58 arranged on the resonant cavity 18, or on an attached measuring device housing or casing (not shown), to produce a uniform pressure between the resonant cavity 18 and the surface of the measurement sample 12. For example, the vacuum cups 58 can be installed in recesses in the resonant cavity face 56, as shown in FIG. 5, or on a recessed surface of an attached measuring device housing (not shown).

For example, an embodiment can include four vacuum cups 58 located at the corners of a rectangular resonant cavity 18, as shown in FIG. 5. Each of the vacuum cups 58 can have be attached to a vacuum source (not shown) by a vacuum tube 60, for example, at the center of the vacuum cups 58, as shown in FIG. 5. Air under the vacuum cups 58 can thus be evacuated to cause the vacuum cups 58 to adhere to the surface of the measurement sample 12.

Pressing the resonant cavity face 56 against the measurement sample 12 with a consistent pressure can improve the accuracy of the film thickness measurements. In addition, applying a uniform pressure across the resonant cavity face 56 can further improve the accuracy. Thus, the vacuum cups 58 can facilitate improved accuracy of film thickness measurements. Additionally, a spring-loaded sensor (not shown) can be used to control the applied load, or pressure, between the resonant cavity face 56 and the measurement sample 12.

Figure 6:
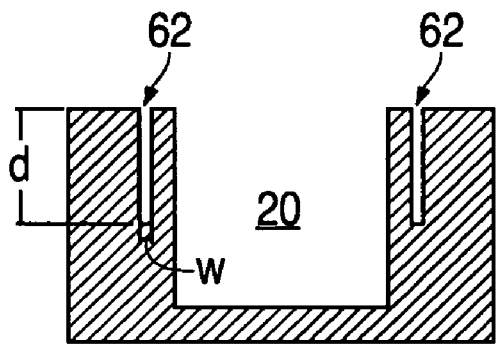
FIG. 6 is a cross-section view of the resonator cavity of FIG. 5.

Moreover, in some embodiments, the resonant cavity face 56 can include a choke groove 62 around the chamber 20. The choke groove 62 can encircle or circumscribe the open side 22 of the chamber 20 in order to improve the effective electromagnetic conductivity between the resonant cavity 18 and the measurement sample 12. For example, as illustrated in FIG. 6, the choke groove 62 can have a depth, "d," that is equivalent to approximately one-quarter of the wavelength ($\lambda/4$) of the baseline resonant frequency of the resonant cavity 18, and a width "w," that is equivalent to approximately 0.05 to 0.1 wavelength. In some embodiments, the choke groove can be filled with a dielectric material, for example, with appropriate adjustment to the groove depth, "d," based on the dielectric constant of the dielectric.

In other applications, choke grooves have been shown to be effective in facilitating electromagnetic conductivity between noncontacting surfaces, for example, in waveguide rotary joints. Thus, the choke grooves 62 around the resonant cavity 18 can facilitate film thickness measurements where the film or substrate surface is not planar, such that a small gap may exist between portions of the face 56 and the surface of the measurement sample 12. That is to say, the choke grooves 62 can make feasible film thickness measurements on measurement samples 12 having a curved or uneven surface.

Finally, in some embodiments of the measuring device 10, a calibration panel with a known film layer thickness can be used to calibrate the measurement. That is, a measurement taken using the calibration panel at approximately the same time as a measurement taken using the measurement sample 12 can be used to account for environment conditions, such as temperature. For example, the calibration panel can have a film layer 14 of known thickness and a substrate 16 composed of the same materials as the measurement sample 12. The processor 36 can factor the resulting measurement using the calibration panel into the correlation algorithm to adjust the algorithm for specific environmental conditions at the time of measurement.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A measurement device for measuring a thickness of a film layer over a substrate, comprising:
    a resonant cavity having an open side, wherein at least a segment of a face around the open side contacts at least a portion of a surface of the film layer and the substrate acts as a wall of the resonant cavity;
    a microwave source to generate a super high frequency electromagnetic wave signal coupled to a first end of the resonant cavity, wherein the microwave source comprises:
        an oscillator to generate a first electrical signal having a frequency that is substantially lower than a resonant frequency of the resonant cavity, wherein the oscillator is located at a remote location from the resonant cavity to thermally isolate the oscillator from the resonant cavity; and
        a frequency multiplier coupled to the oscillator to receive the first electrical signal and convert the first electrical signal into a second electrical signal by increasing the frequency by a predetermined factor, wherein the frequency multiplier is collocated with the resonant cavity;
    a signal detector to sense an output power of the signal coupled to a second end of the resonant cavity; and
    a processor to correlate the output power to the thickness.

2. The measurement device of claim 1, wherein the microwave source comprises:
    a voltage-controlled oscillator having a variable output frequency; and
    a voltage source coupled to the voltage-controlled oscillator to provide an analog control voltage signal to electronically tune the voltage-controlled oscillator to a predetermined frequency.

3. The measurement device of claim 2, wherein the voltage-controlled oscillator variable output frequency has a range of at least one gigahertz.

4. The measurement device of claim 1, wherein the microwave source comprises a dielectric resonator oscillator having a substantially fixed output frequency.

5. The measurement device of claim 4, wherein the dielectric resonator oscillator is tuned at a predetermined fixed output frequency that substantially optimizes a variance of the output power at the predetermined frequency with respect to a resonant frequency of the resonant cavity.

6. The measurement device of claim 1, wherein the microwave source is located at a remote location from the resonant cavity to thermally isolate the microwave source from the resonant cavity.

7. The measurement device of claim 1, wherein the microwave source comprises:
    a fixed frequency oscillator to generate a first electrical signal having a substantially fixed frequency;
    a variable frequency oscillator to generate a second electrical signal having a variable frequency in a frequency range; and
    a mixer to heterodyne the first and second electrical signals to generate a third electrical signal having a combined frequency that is a combination of the fixed frequency and the variable frequency.

8. The measurement device of claim 1, wherein the resonant cavity comprises an electromagnetic resonant chamber tuned to have a predetermined resonant frequency when the face is placed in contact with a substrate surface without the film layer.

9. The measurement device of claim 1, wherein the resonant cavity comprises a plurality of interconnected electromagnetic resonant chambers, each of which is tuned to have a same predetermined resonant frequency when the face is placed in contact with a substrate surface without the film layer.

10. The measurement device of claim 1, wherein the resonant cavity further comprises a choke groove circumscribing the open side.

11. The measurement device of claim 10, wherein the choke groove has a depth of approximately one-quarter of a wavelength of the signal.

12. The measurement device of claim 10, wherein the choke groove is at least partially filled with a dielectric substance.

13. The measurement device of claim 1, wherein the signal detector comprises a Schottky diode that converts the signal into a direct current voltage signal representative of the output power of the signal.

14. The measurement device of claim 1, wherein the processor comprises a computer-readable medium encoded with instructions configured to be executed by the processor in order to perform a correlating algorithm to further correlate the output power to the thickness.

15. The measurement device of claim 14, wherein the output power corresponds to a shifted resonant frequency of the resonant cavity resulting from an effective distance between the face and the surface.

16. The measurement device of claim 14, wherein a maximum of the output power corresponds to a shifted resonant frequency of the resonant cavity.

17. The measurement device of claim 1, further comprising a calibration panel having a known film layer thickness over a known substrate, wherein a measurement is made using the calibration panel to calibrate the correlation of the output power to the thickness in order to account for an environmental condition.

18. The measurement device of claim 1, further comprising:
    a plurality of vacuum cups to adhere to the surface and press the face against the surface with a substantially uniform pressure, and
    a vacuum pump pneumatically coupled to the vacuum cups to create a negative pressure that is lower than an ambient pressure.

19. The measurement device of claim 1, wherein the film layer comprises at least a coat of paint.

20. The measurement device of claim 1, wherein the substrate comprises a composite material.

21. The measurement device of claim 1, wherein the surface is nonplanar.

22. The measurement device of claim 1, wherein a gap exists between at least another segment of the face and the surface.

23. A measurement device for measuring a thickness of a film layer over a substrate, comprising:

means for propagating a super high frequency electromagnetic wave signal, the propagating means having an open side, wherein at least a segment of a face around the open side contacts at least a portion of a surface of the film layer and the substrate acts as a wall of the propagating means;

means for generating a super high frequency electromagnetic wave signal coupled to a first end of the propagating means, wherein the means for generating comprises:

an oscillator means to generate a first electrical signal having a frequency that is substantially lower than a resonant frequency of the means for propagating, wherein the oscillator means is located at a remote location from the means for propagating to thermally isolate the oscillator means from the means for propagating; and a frequency multiplier means coupled to the oscillator means to receive the first electrical signal and convert the first electrical signal into a second electrical signal by increasing the frequency by a predetermined factor, wherein the frequency multiplier means is collocated with the means for propagating;

means for sensing an output power of the signal coupled to a second end of the resonant cavity; and processing means for correlating the output power to the thickness.

24. The measurement device of claim 23, wherein the generating means comprises:

voltage-controlled means for generating a variable output frequency;

means for providing an analog control voltage signal coupled to the generating means to electronically tune the generating means to a predetermined frequency.

25. The measurement device of claim 23, wherein the generating means is located at a remote location from the propagating means to thermally isolate the generating means from the propagating means.

26. The measurement device of claim 23, wherein the propagating means further comprises grooved means for facilitating signal transmission circumscribing the open side.

27. A method of measuring a thickness of a film layer over a substrate, comprising:

adhering a measurement device to at least a portion of a surface of the substrate;

pressing at least a segment of a face around an open side of a resonant cavity having a first end and a second end against the surface with a substantially uniform pressure;

sequentially generating a plurality of electromagnetic wave signals across a first frequency range of at least one gigahertz using a monolithic microwave integrated circuit voltage-controlled oscillator having a variable output frequency, wherein the oscillator is located at a remote location from the resonant cavity to thermally isolate the oscillator from the resonant cavity;

multiplying the first frequency to a second frequency with a frequency multiplier that is collocated with the resonant cavity to reduce signal loss;

individually propagating each of the signals at the second frequency through the resonant cavity from the first end to the second end, the resonant cavity having a resonant frequency;

sensing an output power of each of the signals at the second end; and correlating a frequency having a maximum output power to the thickness.

* * * * *